(12) United States Patent
Hofmann et al.

(10) Patent No.: US 7,942,939 B2
(45) Date of Patent: May 17, 2011

(54) METHOD AND FACILITY FOR PRODUCING A COARSE-GRAINED AMMONIUM SULFATE PRODUCT BY CRYSTALLIZATION

(75) Inventors: Günter Hofmann, Duisburg (DE); Reinhard Scholz, Kerken (DE)

(73) Assignee: Gea Messo GmbH, Duisburg (DE)

( * ) Notice: Subject to any disclaimer, the term of this patent is extended or adjusted under 35 U.S.C. 154(b) by 0 days.

(21) Appl. No.: 12/863,661

(22) PCT Filed: Jan. 23, 2009

(86) PCT No.: PCT/EP2009/050807
§ 371 (c)(1),
(2), (4) Date: Jul. 20, 2010

(87) PCT Pub. No.: WO2009/095361
PCT Pub. Date: Aug. 6, 2009

(65) Prior Publication Data
US 2011/0038781 A1   Feb. 17, 2011

(30) Foreign Application Priority Data
Feb. 1, 2008   (DE) .......................... 10 2008 007 154

(51) Int. Cl.
*B01D 9/00*   (2006.01)
(52) U.S. Cl. ..................................... 23/302 A; 422/285
(58) Field of Classification Search ................ 23/302 A; 422/255, 285
See application file for complete search history.

(56) References Cited

U.S. PATENT DOCUMENTS
4,004,886 A   1/1977   Thijssen et al.
4,015,946 A * 4/1977   Bonnema et al. ............... 23/300

FOREIGN PATENT DOCUMENTS

| | | |
|---|---|---|
| CH | 467103 A | 1/1969 |
| DE | 1260440 A1 | 2/1968 |
| DE | 102007014504 A1 | 10/2007 |
| EP | 0632738 B1 | 11/1995 |
| GB | 1094878 | 12/1967 |
| JP | 2005194153 A | 7/2005 |
| WO | 0056416 A1 | 9/2000 |

OTHER PUBLICATIONS

International Search Report and Written Opinion of the International Searching Authority from corresponding Patent Cooperation Treaty (PCT) Application No. PCT/EP2009/050807, mailed May 8, 2009.
English Translation of the International Preliminary Report on Patentability from corresponding Patent Cooperation Treaty Patent Application No. PCT/EP2009/050807 dated Sep. 7, 2010.

* cited by examiner

*Primary Examiner* — Edward M Johnson
(74) *Attorney, Agent, or Firm* — Van Dyke, Gardner, Linn & Burkhart, LLP

(57) ABSTRACT

A method and installation for the production of a coarse-grained ammonium sulfate product by crystallization includes firstly generating a crystal having a grain smaller than the desired grain size in a pre-crystallizer and withdrawing a suspension therefrom, from which the fine crystal was previously separated in a classification connecting piece. This suspension, which contains medium-sized grain, is then conducted with a proportion of undersaturated mother liquor, which is sufficient for further crystal growth, into a DTB product crystallizer and crystallized therein to a desired grain size. The heating of the product crystallizer is performed by the heat contained in the vapors of the pre-crystallization. The pre-crystallization may also operate according to the DTB principle, wherein the mother liquor needed for crystallization is supplied in the form of separately admixed concentrated sulfuric acid and ammonia into the external solution loop of the pre-crystallizer. The reaction heat released in this case may be sufficient for the operation of the entire process.

30 Claims, 1 Drawing Sheet

METHOD AND FACILITY FOR PRODUCING A COARSE-GRAINED AMMONIUM SULFATE PRODUCT BY CRYSTALLIZATION

CROSS REFERENCE TO RELATED APPLICATION

The present application claims the priority benefits of International Patent Application No. PCT/EP2009/050807, filed on Jan. 23, 2009, which is hereby incorporated herein by reference in its entirety.

BACKGROUND OF THE INVENTION

The invention relates to a method for the continuous production of a coarse-grained ammonium sulphate product by crystallization and to an installation for carrying out this method.

Ammonium sulphate (($NH_4)_2SO_4$) is a product which is produced on a large scale and is used mainly as fertilizer in agriculture to provide nitrogen and sulphur. In industrial terms, ammonium sulphate is produced as a by-product in some chemical processes, in particular in the production of caprolactam. In order to satisfy the requirements as a fertilizer, the ammonium sulphate should be available as a coarse-grained product (grain size d' (RRSB) in the range of 2 to 4 mm). This ensures effective spreading power and, when being mixed with other fertilizing substances, it suppresses the tendency towards demixing.

Course-grained crystallizates can be produced from solutions in crystallizers of the DTB (Draft Tube Baffled) type or of the Oslo type. Both cases encounter the problem that the average grain size of the product crystallizate produced in the crystallizer is subjected to periodic fluctuations, i.e., phases with a high coarse grain proportion alternate with phases in which predominantly fine-grained crystallizate (e.g., grain size of less than 1.5 mm) is produced. This is the consequence of strong, spontaneous primary nucleation at elevated oversaturation in the crystallizer. In operating phases with pronounced coarse grain formation, all of the nuclei formed are dissolved by the strong fine crystal dissolution as a result of the temperature elevation in the heat exchanger of the external solution circuit of a DTB crystallizer or in the circulation of an Oslo crystallizer.

EP 0632738 B1 discloses a continuous crystallization method, in which a coarse-grained ammonium sulphate crystallizate can be produced from an oversaturated aqueous ammonium sulphate solution in a DTB crystallizer. In this method, a suspension of oversaturated ammonium sulphate solution and already formed crystallizate is constantly circulated within a DTB crystallizer in an internal circuit. By evaporation of the solvent (water), new oversaturation is continuously produced which is then broken down as a consequence of the crystallization which occurs. The vapour produced during evaporation is drawn off at the head of the DTB crystallizer. From a part which is separated from the internal circuit of the suspension by means of flow guide walls in the upper region of the crystallization chamber of the DTB crystallizer and in which in contrast to the base region of the crystallizer there is provided a clarified solution having a solids proportion consisting substantially of crystallization nuclei and fine crystals. A partial flow of clarified solution is drawn off and, after dissolution of the solids proportion contained therein, is then guided back into the base region of the crystallization chamber. In order to dissolve the solids proportion, a heat exchanger is connected into the external circuit and elevates the temperature of the clarified solution and thus the power of the solvent to dissolve ammonium sulphate. Moreover, the supply line, through which new concentrated ammonium sulphate solution can be fed into the crystallizer, also issues into the external circuit upstream of the heat exchanger. A partial flow of suspension with the proportion of solids contained therein at the desired grain size of the product crystallizate is continuously drawn off from the base region. The product crystallizate is separated from the mother solution in a thickener and by subsequent centrifugation and the mother solution is then guided back into the DTB crystallizer. In order to increase production of a sufficiently coarse-grained crystallizate and to improve production with regard to cyclical fluctuations of the grain size, in this method a crystallizate suspension of ammonium sulphate is fed at a constant inflow rate from an external source into the crystallizer, in addition to the supply of saturated ammonium sulphate solution.

EP 0632738 B1 does not disclose the manner in which the suspension is produced, i.e., whether it has been produced for instance by dissolving comminuted product crystallizate or in a separate crystallizer. It is merely specified that this suspension must satisfy specific conditions: the temperature of the suspension fed in must not exceed the operating temperature in the crystallizer. Moreover, the suspension must contain 6-24 vol. % crystallizate, wherein at least 35% of the crystals are larger than 1.2 mm, and the feed of the suspension is dimensioned such that the weight of the crystals in the fed-in suspension is in the range of 4-25% of the weight of the crystals in the suspension including the product crystallizate, which suspension is drawn off from the base region of the crystallizer. This controlled feed of crystal suspension into a crystallizer to influence the grain size is also defined as seeding.

WO 00/56416 discloses a method for controlling the grain size in continuous mass crystallization which is also provided for producing the coarse-grained ammonium sulphate crystallizate in an Oslo crystallizer or DTB crystallizer and in which, in a similar manner to the method in accordance with EP 0632738 B1, seeding is effected with an externally supplied crystal suspension. The seeding product is a crystallizate which is produced in its parameters independently of the current crystallization process and which has an average grain diameter of 0.1-1.0 mm. In this method, the temperature of the seeding product during the addition also must not be higher than the operating temperature in the crystallizer but must be up to 40° C., preferably 10-30°, less. All other feeds and re-circulations are free of solids. In particular, this means that the feedstock for producing the ammonium sulphate product crystallizate is supplied as a preheated, solid-free ammonium sulphate feed solution, and that the external circuit consisting of the drawn-off solution with a fine solids proportion leads from the crystallizer initially to a heat exchanger which by elevating the temperature of the solution serves to re-dissolve the solids proportion, before the solid-free solution is then guided back into the crystallizer. The heat energy for heating the heat exchanger is provided by means of the vapour which is drawn off from the crystallizer and is brought to a higher temperature level initially by means of vapour compression. From the base region of the crystallizer, a suspension with a solids proportion at the desired grain size is drawn off in a continuous manner and is separated by centrifugation into product crystallizate and mother solution, wherein the mother solution is conveyed into an intermediate vessel from where it is fed back into the circulating line of the external circuit of the crystallizer. The seeding product is preferably added in a quantity, the solids proportion of which amounts to 5-30 wt. % of the solid discharged from the crystallizer in each case. The solids proportion of the seeding product can be produced e.g., by mechanical comminution of a portion of the product crystallizate and/or by a separate crystallization stage.

JP 2005-194153 A discloses an installation, designed as a DTB crystallizer, for the production of ammonium sulphate crystallizate, in which an external circuit for clarified solution is provided which is connected to a clarifying zone of the crystallizer and into which optionally there is incorporated a heat exchanger or a supply line for solvents (e.g., water or undersaturated ammonium sulphate solution) for the purpose of dissolving the contained solids proportion. Moreover, the clarifying zone is connected directly or indirectly via the external circuit to a further discharge line, by means of which a suspension containing only fine crystallizate as the solid can be discharged completely from the process, in order to obtain, e.g., fine-grained ammonium sulphate product. Furthermore, connected to the uppermost part of the clarifying zone is also a third discharge line, by means of which any excess crystallization nuclei and superfine crystallizate can be drawn off and guided into a collecting vessel where required. In order to dissolve the solids, solvents are added to the collecting vessel from where the solution obtained is guided into a neutralisation vessel, in which it is added to sulphuric acid and ammonia and is heated by the neutralisation reaction associated therewith. The heated solution is then fed into the crystallizer.

SUMMARY OF THE INVENTION

The present invention provides a method and apparatus for the production of a coarse-grained ammonium sulphate product that keeps production efficiency as constant as possible and maintains a high yield. A coarse-grained ammonium sulphate crystallizate can be produced with the smallest possible use of processing energy to be supplied.

Embodiments of the invention provide for the continuous production of a coarse-grained ammonium sulphate product (grain size d' at least 2.4 mm) by crystallization of an ammonium sulphate solution in a product crystallization stage which is operated in accordance with the DTB principle and in which during evaporation of water a suspension of mother solution and ammonium sulphate crystals is constantly circulated in an internal circuit and a clarified partial flow of solution is constantly drawn off from the upper region thereof in an external circuit and is heated in order to dissolve the solids contained therein and is guided back as clear solution into the lower region of the product crystallization stage; in so doing a vapour is continuously drawn off from the head of the product crystallization stage, and a new suspension is also supplied from outside and a partial flow of the suspension containing the coarse-grained ammonium sulphate product is drawn off from the lower region of the product crystallization stage.

In the case of this type of method, the stated object is achieved by virtue of the fact that the new suspension is produced in a pre-crystallization stage located upstream of the product crystallization stage, wherein the solids proportion of the new suspension is drawn off by means of a classifying suspension discharge without any appreciable proportion of fine crystallizate, which has a grain size of less than 0.5 mm, and of crystallization nuclei and is supplied with a proportion of undersaturated mother solution, which is sufficient to ensure further crystal growth to the desired grain size, from the pre-crystallization stage directly to the product crystallization stage; it is also provided in the invention that the clarified solution is heated in the external circuit of the product crystallization stage indirectly or directly by the heat of the vapours which are drawn off from the pre-crystallization stage. Therefore, a separate heat energy supply from outside is no longer required for operating the product crystallization stage.

The core of the invention is particularly evident in the fact that in the pre-crystallization a suspension of mother solution and ammonium sulphate product crystallizate is produced in a controlled manner, from which practically all of the fine-particulate solids have been removed by means of classification. The average grain size d' (RRSB) in the suspension drawn off from the pre-crystallization stage is expediently in the range of 1-2 mm; where d'=2 mm about 80% of the crystallizate has a grain size of at least 1.6 mm, wherein the fine grain of less than 0.8 mm, preferably less than 1 mm, in particular less than 1.3 mm, has been practically eliminated by means of classification. Therefore, the input material of the product crystallization is provided in the form of a suspension which ensures the formation of a coarse crystallizate from the originally medium-size crystallizate of the supplied suspension without the risk of undesired fine crystal growth. As a consequence, a product crystallizate is produced which has a grain size bandwidth which is comparatively narrow from the outset, so that the method permits a high coarse crystallizate yield with a low undersized grain quantity.

In order to ensure the desired crystal growth in the product crystallization stage, the new suspension fed in carries such an amount of mother solution with it or such an amount of mother solution is guided separately from the pre-crystallization to the product crystallization stage that the suspension level in the product crystallization stage remains constant and sufficient crystal surface is available for grain growth without spontaneous nucleation. Therefore, undersaturated mother solution is added to the suspension or is guided separately with the suspension into the product crystallization stage. In order to avoid disruptions, smaller quantities of diluted solution or condensate can also be fed directly into the product crystallization stage, if required.

Since the suspension is supplied to the product crystallization stage in an expedient manner without any separate cooling, there are also no appreciable heat losses, so that in contrast for instance to the methods in accordance with EP 0632738 B1 or WO 00/56416 the entrained heat can be used for solvent evaporation in the product crystallization stage.

The pre-crystallization stage may be operated in the same manner as the product crystallization stage in accordance with the DTB principle. It is particularly expedient to produce the required mother solution by separately supplying concentrated sulphuric acid and ammonia directly in the pre-crystallization. This has the significant advantage that an exothermic reaction takes place which can be used to cover the process energy of the method. In a particularly advantageous manner, at least the predominant part of the sulphuric acid to be supplied is fed into the external suspension circuit of the DTB pre-crystallization stage, and furthermore on the pressure side (downstream of the circulating pump), so that the heat thus released can effect dissolution of solids in the external solution circuit. This effect is also assisted by the heat of the ammonium sulphate formation, even if ammonia is fed completely or partially into the external suspension circuit. As a consequence, it is possible to save all expenditure for a separate indirect heat exchange in the external solution circuit. However, it is fundamentally also possible to introduce the reactants for the ammonium sulphate formation completely or partially into the crystallization chamber of the pre-crystallization. When supplying the required fresh solution in the form of the two reactants to the pre-crystallization, the entire heat requirement for dissolution of solids and evaporation of water can be covered for the pre-crystallization stage and owing to the thermo-technical coupling with the product crystallization stage the heat requirement for the entire process can be readily covered merely by the reaction heat. Therefore, the method in accordance with the invention no longer requires a separate heat supply from outside.

In order to supply the product crystallization stage with a sufficient amount of undersaturated mother solution, it can be provided that it is removed as a partial flow from the external solution circuit of the pre-crystallization stage. This can occur at a location on the circuit, at which the originally entrained solids have already been dissolved in the solution preferably as a result of an addition of condensate or diluted solution into the circuit or else on account of an elevation in temperature of the solution. However, provision can also be made initially to draw off a partial flow, which still contains fine solids, from the external solution circuit and only after this to undersaturate it with condensate or diluted solution. A further alternative is to draw off a partial flow of clarified solution directly from the pre-crystallization stage and to mix this partial flow with condensate or diluted solution to achieve undersaturation. In any event, the controlled supply of undersaturated mother solution to the product crystallization stage permits a flexible adaptation to changing process conditions.

In an embodiment of the invention, the operating temperature of the pre-crystallization stage is at least 10° C., preferably about 15-45° C., higher than in the product crystallization stage.

A method sequence which is particularly advantageous with regard to energy usage is achieved if the product crystallization stage is formed from at least two partial crystallization stages which are connected in parallel with regard to the supply of the new suspension and the discharge of the suspension containing the coarse-grained ammonium sulphate product and are connected in each case in series with regard to the indirect heating of its external solution circuit such that only the first partial stage is heated directly with the vapours of the pre-crystallization stage, whereas the partial stages located downstream are each heated with the vapours of the partial stage located directly upstream. In an expedient manner, the vapours are collected and condensed for at least partial reuse in the method.

In another embodiment of the method it is provided that the coarse-grained ammonium sulphate product of the suspension drawn off from the product crystallization stage is separated from the mother solution and for the purpose of displacing adhering mother solution is subsequently washed, dried and finally subjected to screening, wherein the undersized grain separated off in the screening is then dissolved with condensate and guided back into the product crystallization stage.

These and other objects, advantages and features of this invention will become apparent upon review of the following specification in conjunction with the drawings.

BRIEF DESCRIPTION OF THE DRAWINGS

The invention will be explained in more detail hereinafter with reference to the single FIGURE which shows a schematically illustrated installation for carrying out the method.

Referring now to the drawing and the illustrative embodiments depicted therein, an installation is illustrated having a pre-crystallizer (1a) having at least two parallel product crystallizers (1b, 1c), each of which operates in accordance with the DTB principle, i.e., are equipped in each case with a flow guide tube 2a, b, c and an internal pump 7a, b, c for an internal suspension circuit indicated in each case by illustrated arrows. Furthermore, the crystallizers 1a, b, c each have an external solution circuit 3a, b, c which is maintained by a pump 4a, b, c and whose circulating volume is substantially less than that of the internal suspension circuit (typically about 20% of the internal circuit volume). The lines of the external solution circuits 3a, b, c which each issue from a clarifying zone in the upper region of the crystallizer 1a, b, c and terminate in the base region 6a, b, c of the crystallizer 1a, b, c are each provided with a condensate supply line 13a, b, c, through which condensate for diluting the solution can be added if required. Whereas, the two external solution circuits 3b, c of the two product crystallizers 1b, c each have an indirect heat exchanger 12b, c for dissolution of solids, such a heat exchanger is not provided in the case of the pre-crystallizer 1a. Its external solution circuit 3a is equipped instead with a supply 9 for concentrated sulphuric acid and a supply 10 for ammonium; both supplies 9, 10 are located in an expedient manner in the region of the pressure side downstream of the pump 4a.

Figure 1:
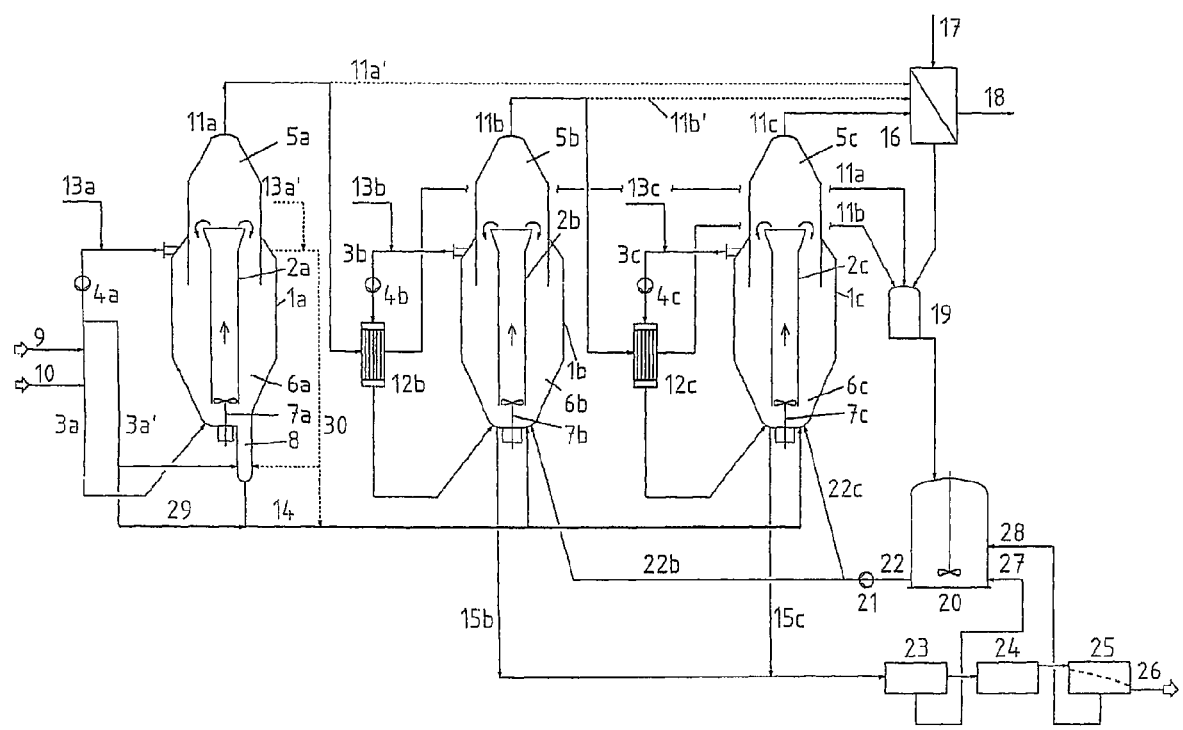

The pre-crystallizer 1a is provided in its base region 6a with a classification connecting piece 8, into the lower part of which a branch line 3a' of the external solution circuit 3a issues so as to produce an entrainment effect, wherein the line 3a' branches off preferably upstream of the supplies 9, 10, as it then carries a solution which, although undersaturated by the condensate addition, has not yet been heated by reaction heat and therefore is not able to apply solvent to the crystallizate in the classification connecting piece 8 to such a significant extent. Connected to the lower end of the classification connecting piece 8 is a suspension line 14 which branches and leads in each case into the base region 6b, c of the two product crystallizers 1b, c which in this respect are connected in parallel. Leading off from the branch line 3a' is a mother solution line 29, through which the quantity of undersaturated mother solution required for further crystal growth can be guided into the suspension line 14; this mother solution line 29 could also lead directly into the two product crystallizers 1b, c. Instead of the mother solution line 29, a mother solution line 30 (illustrated by dashed lines) can also be guided directly from the clarifying zone of the pre-crystallizer 1a to the suspension line 14 or directly to the product crystallizers 1b, c. Optionally, a branch can also be guided into the classification connecting piece 8. A delivery pump and valves for regulating the flow rate in the mother solution line 29 are not illustrated.

Also, with regard to the suspension discharge, the two crystallizers 1b, c are connected in parallel, and furthermore via the suspension discharge lines 15b, c which issue from the base regions 6b, c and join one another. However, in relation to the heating of the heat exchangers 12b, c the two product crystallizers 1b, c are connected in series, as the heat exchanger 12b of the first product crystallizer 1b is connected to the vapour line 11a issuing from the head 5a of the pre-crystallizer 1a, whereas the heat exchanger 12c of the second product crystallizer 1c is connected to the vapour line 11b issuing from the head 5b of the first product crystallizer 1b. The vapour lines 11a, b run downstream of the two heat exchangers 12b, c to a condensate collecting vessel 19 for collecting the condensate formed during heat exchange, whereas a vapour line 11c which issues from the head 5c of the second product crystallizate 1c leads to a condenser 16 which is provided expediently for capturing and condensing vapours from the process and has a cooling water supply line 17 and a cooling water discharge line 18. The condenser 16 is connected by lines to the condensate collecting vessel 19. In the event that one of the two product crystallizers 1b, c must be taken temporarily out of operation, two bypass lines 11a', b' are optionally provided to bypass the heat exchangers 12b, c and directly introduce the vapours into the condenser 16. Essentially, it would be possible to connect even more than only the two product crystallizers 1b, c in the illustrated manner in parallel with regard to the suspension supply line and discharge line and in series with regard to heating.

In order to obtain a saleable, coarse-grained ammonium sulphate product, the suspension which is drawn off from the product crystallizers 1b, c by the suspension discharge lines 15a, b is initially guided into a solid/liquid separating device 23 which can consist, e.g., of a hydrocyclone and a centrifuge located downstream and in which the crystallizate can also be washed. In order to discharge the separated mother solution or the washing fluid, the solid/liquid separating device 23 is connected to a mixing vessel 20 by means of a recirculation 27. The damp crystallizate passes into a drying device 24 located downstream, from where it passes into a screening device 25, in which the existing undersized grain which makes up only a small quantity proportion is separated form the saleable, coarse-grained ammonium sulphate product crystallizate. The separated fine crystallizate can be transported via a recirculation 28 into the mixing vessel 20, in which it can then be dissolved with condensate which can likewise be introduced into the mixing vessel 20 from the condensate collecting vessel 19 through a line. Through the solution lines 22 and 22b, c, the solution formed in the mixing vessel 20 can be guided back into the product crystallizers 1b, c for crystallization by means of the pump 21. With regard to the operating temperatures, about 100° C. is to be considered expedient for the pre-crystallizer 1a, about 80° C. for the first product crystallizer 1b and about 60° C. for the second product crystallizer 1c.

It is self-evident that the illustrated exemplified embodiment is only schematized and does not contain all of the details which are self-evident to the person skilled in the art for carrying out the method. For example, there is no repelling facility in the method for limiting the content of impurities.

The method disclosed herein has proven to be extremely advantageous, as it is able to dispense completely with the separate supply of process heat from outside and thus facilitates low production costs. With high production efficiency, it provides a product crystallizate containing in comparative terms only small quantities of fine crystallizate and facilitates crystallization operation whilst substantially obviating spontaneous nucleation, since a sufficient quantity of suspension with a substantially medium grain size is always supplied and affords a sufficiently large crystal surface for controlled crystal growth to the desired coarse grain size. With the controlled usage of reaction heat in the pre-crystallization, it is possible at this location to completely dispense with the use of a heat exchanger, so that the installation outlay is reduced accordingly.

Changes and modifications in the specifically described embodiments can be carried out without departing from the principles of the invention which is intended to be limited only by the scope of the appended claims, as interpreted according to the principles of patent law including the doctrine of equivalents.

LIST OF REFERENCE NUMERALS 1 pre-crystallizer
1b, c product crystallizer
2a, b, c flow guide tube
3a, b, c external circuit line
3a' branch line
4a, b, c pump
5a, b, c head of the crystallizer
6a, b, c base region of the crystallizer
7a, b, c internal pump
8 classification connecting piece
9 supply for sulphuric acid
10 supply for ammonia
11a, b, c vapour line
11a', b' bypass line
12b, c heat exchanger
13a, a', b, c condensate supply line
14 suspension line
15b, c suspension discharge line
16 condenser
17 cooling water supply line
18 cooling water discharge line
19 condensate collecting vessel
20 mixing vessel
21 pump
22 solution line
22b, c solution line
23 solid/liquid separating device
24 drying device
25 screening device
26 ammonium sulphate product crystallizate
27 mother solution recirculation
28 fine crystallizate recirculation
29 mother solution line
30 mother solution line

The invention claimed is:

1. Method for the continuous production of a coarse-grained ammonium sulphate product by crystallization of an ammonium sulphate solution in a product crystallization stage which is operated in accordance with a draft tube baffled principle, said method comprising:

during evaporation of water, constantly circulating a suspension of mother solution and ammonium sulphate crystals in an internal circuit;

constantly drawing off a clarified partial flow of solution from an upper region of said internal circuit in an external circuit and heating said solution so as to dissolve solids contained therein and then guide the heated solution back as a clear solution into the lower region of the product crystallization stage;

continuously drawing off vapours from the head of the product crystallization stage, supplying new suspension from outside and drawing off a partial flow of the suspension containing the coarse-grained ammonium sulphate product from the lower region of the product crystallization stage;

producing a new suspension in a pre-crystallization stage located upstream of the product crystallization stage, draw off the solids proportion of the new suspension by means of a classifying suspension discharge without an appreciable proportion of fine crystallizate, which has a grain size of less than 0.5 mm, and of crystallization nuclei, and is supplied with a proportion of undersaturated mother solution, which is sufficient to ensure further crystal growth to the desired grain size, from the pre-crystallization stage directly to the product crystallization stage; and heating the clarified solution in the external circuit of the product crystallization stage by heat from vapours drawn off from the pre-crystallization stage.

2. Method as claimed in claim 1 including drawing off the solids proportion of the new suspension without an appreciable proportion of fine crystallizate with a grain size of less than 0.8 mm from the classifying suspension discharge.

3. Method as claimed in claim 1, wherein the average grain size of the crystallizate in the drawn-off new suspension is in the range of approximately 1-2 mm.

4. Method as claimed in claim 1 including supplying the new suspension without cooling.

5. Method as claimed in claim 1 including operating the pre-crystallization stage in accordance with the draft tube baffled principle.

6. Method as claimed in claim 1 including providing the mother solution required for the pre-crystallization stage by supplying concentrated sulphuric acid and ammonia to the pre-crystallization stage.

7. Method as claimed in claim 5 including feeding at least a predominant portion of the sulphuric acid into an external solution circuit of the pre-crystallization stage on the pressure side of the external solution circuit, so that reaction heat thus released effects dissolution of solids in the external solution circuit.

8. Method as claimed in claim 7 including feeding the ammonia in completely or partially on the pressure side of the external solution circuit.

9. Method as claimed in claim 7 including providing substantially the entire heat required for dissolution of solids and evaporation of water in the pre-crystallization stage by the reaction heat from supplied sulphuric acid and ammonia.

10. Method as claimed in claim 5 including removing the undersaturated mother solution as a partial flow from an external solution circuit with clarified solution of the pre-crystallization stage after dissolution of solids effected by at least one chosen from i) the addition of condensate or diluted solution and ii) an elevation in temperature of the solution.

11. Method as claimed in claim 5 including branching off a partial flow of an external solution circuit of the pre-crystallization stage with clarified solution, which still contains fine solids and mixing with condensate or diluted solution for the purpose of producing the undersaturated mother solution.

12. Method as claimed in claim 11 including removing the mother solution from the external solution circuit prior to heating of the mother solution remaining in the solution circuit.

13. Method as claimed in claim 5 including drawing off a partial flow of clarified solution separately from a clarifying zone of the pre-crystallization stage and mixing with condensate or diluted solution for the purpose of producing the undersaturated mother solution.

14. Method as claimed in claim 1, wherein an operating temperature of the pre-crystallization stage is at least approximately 10° C. higher than the operating temperature of the product crystallization stage.

15. Method as claimed in claim 1, wherein the product crystallization stage is formed from at least two partial crystallization stages which are connected in parallel with regard to the supply of the new suspension and the discharge of the suspension with the coarse-grained ammonium sulphate product and are connected in each case in series with regard to the indirect heating of the external solution circuit such that only the first partial stage is heated directly with the vapours from the pre-crystallization stage, whereas the partial stages located downstream are each heated with the vapours from the partial stage located immediately upstream.

16. Method as claimed in claim 1 including capturing and condensing the vapours.

17. Method as claimed in claim 16, wherein the coarse-grained ammonium sulphate product of the suspension drawn off from the product crystallization stage is separated from the mother solution, is washed, dried and subjected to screening, wherein the undersized grain separated off in the screening is then dissolved with condensate and guided back into the product crystallization stage.

18. A facility for continuous production of a course-grained ammonium sulphate product, said installation comprising:
   at least one product crystallizer which operates in accordance with a draft tube baffled principle and comprises an external circuit line for clarified solution and a heat exchanger which is connected into the external circuit line;
   a vapour line which is disposed at a head of the product crystallizer, also having a suspension line for supplying new suspension and having a suspension discharge line which leads from a base region of the product crystallizer;
   a pre-crystallizer that is located upstream of the product crystallizer;
   another vapour line which leads from the head of said pre-crystallizer to the heat exchanger of the product crystallizer and a classification connecting piece which is attached at a base region of said pre-crystallizer, the suspension line issues from a lower end of said pre-crystallizer and leads to the product crystallizer.

19. Installation as claimed in claim 18, wherein said pre-crystallizer comprises a draft tube baffled crystallizer having an external circuit line for clarified suspension.

20. Installation as claimed in claim 18 including a branch line which issues into a lower part of the classification connecting piece wherein said branch line leads off from the external circuit line of the pre-crystallizer.

21. Installation as claimed in claim 19 including separate supplies for concentrated sulphuric acid and ammonia to supply the pre-crystallizer with the mother solution, wherein said supply for sulphuric acid is disposed on a pressure side downstream of a pump incorporated into the external circuit line.

22. Installation as claimed in claim 21, wherein said supply for ammonia issues into a pressure side of the external circuit line.

23. Installation as claimed in claim 21, wherein the branch line branches off from the external circuit line upstream of the separate supplies for concentrated sulphuric acid and ammonia.

24. Installation as claimed in claim 19 including a mother solution line that leads from the external circuit line or the branch line to the suspension line or directly to the product crystallizer and wherein the mother solution line is connected directly or indirectly to a supply line for condensate or diluted solution.

25. Installation as claimed in claim 24, wherein i) the mother solution line or ii) a branch line from which the mother solution line branches off from the external circuit line upstream of a location at which the mother solution can be heated.

26. Installation as claimed in claim 19, including a mother solution line which leads from a clarifying zone of the pre-crystallizer to the suspension line or directly to the product crystallizer, wherein said mother solution line is connected to a supply line for condensate or diluted solution.

27. Installation as claimed in claim 18, including at least two product crystallizers which are connected in parallel with one another to the suspension line, wherein only the heat exchanger of one of the product crystallizers is connected for heating purposes directly to the vapour line of the pre-crystallizer, and wherein the heat exchangers of the other product crystallizers are each connected for heating purposes directly to the vapour line of another product crystallizer.

28. Installation as claimed in claim 18, including a condenser for condensing vapours and a condensate collecting vessel.

29. Installation as claimed in claim 18, including a solid/liquid separating device, a drying device and a screening device for processing the coarse-grained ammonium sulphate product.

30. Installation as claimed in claim 28, including a mixing container which is connected via a solution line to the product crystallizer and in which the undersized grain separated off in the screening device can then be dissolved with the condensate of the condensate collecting vessel and can be guided back through the solution line.

* * * * *

UNITED STATES PATENT AND TRADEMARK OFFICE
CERTIFICATE OF CORRECTION

| | |
|---|---|
| PATENT NO. | : 7,942,939 B2 |
| APPLICATION NO. | : 12/863661 |
| DATED | : May 17, 2011 |
| INVENTOR(S) | : Günter Hofmann and Reinhard Scholz |

It is certified that error appears in the above-identified patent and that said Letters Patent is hereby corrected as shown below:

On the title page, item (54) and column 1, lines 1-3, Title: "METHOD AND FACILITY FOR PRODUCING A COURSE-GRAINED AMMONIUM SULFATE PRODUCT BY CRYSTALLIZATION"

Should be
Title: -- METHOD FOR PRODUCING A COARSE-GRAINED AMMONIUM SULPHATE PRODUCT BY CRYSTALLIZATION AND FACILITY FOR PERFORMING THE METHOD --

Signed and Sealed this
Nineteenth Day of March, 2013

Teresa Stanek Rea
*Acting Director of the United States Patent and Trademark Office*